(12) United States Patent
Boucher et al.

(10) Patent No.: US 7,737,596 B2
(45) Date of Patent: Jun. 15, 2010

(54) ANTI-COGGING APPARATUS FOR PERMANENT MAGNET ELECTRICAL MACHINES

(75) Inventors: Bruno Boucher, Gaspe (CA); Eric Adams, Gaspe (CA); Simon Cote, Gaspe (CA); Daniel Massicotte, Saint-Lambert-de-Lauzon (CA)

(73) Assignee: Eocycle Technologies, Inc., Levis (Quebec) (CA)

( * ) Notice: Subject to any disclaimer, the term of this patent is extended or adjusted under 35 U.S.C. 154(b) by 565 days.

(21) Appl. No.: 11/657,138

(22) Filed: Jan. 24, 2007

(65) Prior Publication Data

US 2008/0174189 A1    Jul. 24, 2008

(51) Int. Cl.
*H02K 16/00*    (2006.01)

(52) U.S. Cl. .................................. 310/156.73; 310/266

(58) Field of Classification Search ................. 310/112, 310/114, 181, 266, 268, 156.73
See application file for complete search history.

(56) References Cited

U.S. PATENT DOCUMENTS

| | | | | |
|---|---|---|---|---|
| 3,558,947 | A | * | 1/1971 | Burr ...................... 310/154.06 |
| 4,535,263 | A | | 8/1985 | Avery |
| 4,751,415 | A | | 6/1988 | Kitamori et al. |
| 4,751,486 | A | * | 6/1988 | Minato ........................ 335/272 |
| 4,775,812 | A | * | 10/1988 | Kitamori ..................... 310/112 |
| 5,783,890 | A | | 7/1998 | Mulgrave |
| 5,886,440 | A | | 3/1999 | Hasebe et al. |
| 5,973,436 | A | | 10/1999 | Mitcham |
| 6,215,207 | B1 | | 4/2001 | Kondo et al. |
| 6,597,078 | B2 | | 7/2003 | Crapo et al. |
| 6,724,113 | B2 | | 4/2004 | McVicar |
| 6,727,629 | B1 | | 4/2004 | Soghomonian et al. |
| 6,876,115 | B2 | | 4/2005 | Takahashi et al. |
| 6,885,125 | B2 | | 4/2005 | Inayama et al. |
| 6,891,285 | B2 | | 5/2005 | Harned et al. |
| 2002/0140308 | A1 | | 10/2002 | Inayama et al. |
| 2003/0071530 | A1 | | 4/2003 | Takahashi |
| 2003/0080641 | A1 | | 5/2003 | Ando et al. |
| 2005/0121990 | A1 | | 6/2005 | Kaneko |
| 2005/0236912 | A1 | | 10/2005 | Beakley et al. |
| 2006/0012252 | A1 | | 1/2006 | Miyata et al. |
| 2006/0038457 | A1 | | 2/2006 | Miyata |

FOREIGN PATENT DOCUMENTS

EP    1 615 322 A1    1/2006

OTHER PUBLICATIONS

Z. Q. Zhu, "Influence of Design parameters on Cogging Torque in Permanent Magnet Machines", IEEE Transactions on Energy Conversion, vol. 15, No. 4, Dec. 2000, p. 407-412.

* cited by examiner

*Primary Examiner*—Dang D Le
(74) *Attorney, Agent, or Firm*—Michaelson & Associates; Peter L. Michaelson

(57) ABSTRACT

The present invention provides cancellation of cogging torque of a permanent magnet electrical machine using two sets of magnetic elements, one set is mechanically coupled to the stator with the other set being mechanically coupled to the rotor of the machine. At least one of the two sets has permanent magnets with the magnetic elements of the other set being made of permanent magnets or non-magnetized ferromagnetic materials such as soft iron. When the arrangement of the elements of the two sets is properly designed, magnetic attraction and repulsion forces between the magnetic elements of the two sets produces, as the machine operates, an anti-cogging torque which substantially cancels the cogging torque of the machine.

30 Claims, 9 Drawing Sheets

ANTI-COGGING APPARATUS FOR PERMANENT MAGNET ELECTRICAL MACHINES

BACKGROUND OF THE INVENTION

1) Field of the Invention

The invention relates to permanent magnet electrical machines. More specifically, the invention relates to an apparatus for reducing the cogging torque in a rotary permanent magnet electrical machine.

2) Description of the Prior Art

The rotary permanent magnet (PM) electrical machines are known to suffer from cogging torque. The cogging torque is an undesirable component of the torque of a PM machine and is caused by the interaction between the rotor permanent magnets and the stator poles of the machine. It causes undesirable vibrations of the machine and it is particularly prominent on start up of the machine.

Several methods have been proposed for reducing the cogging torque in PM machine. Those methods include:
  uniform or variable air gap thickness;
  phase shifting of the poles;
  skewing of the stator poles or of the rotor magnets; and
  use of fractional poles.

Most of the proposed methods used for reducing the cogging torque also reduce the efficiency of the machine.

One proposed method for reducing the cogging torque of a PM machine is the mechanical coupling of two machines, each machine having a stator with electromagnets and a rotor with permanent magnets. The two machines are phase shifted such that the cogging torques of the two machines cancel out. In such a dual machine, most of the critical components are doubled and the cost of the machine is substantially increased.

SUMMARY OF THE INVENTION

It is an aim of the present invention to provide an apparatus for reducing the cogging torque of a rotary PM machine by generating an anti-cogging torque that at least partly cancels out the cogging torque of the rotary PM machine.

Cancellation of the cogging torque is provided by two sets of magnetic elements, one set being mechanically coupled to the stator and the other set being mechanically coupled to the rotor of the PM machine. At least one of the two set comprises permanent magnets and the other set can comprise permanent magnets or non-magnetized ferromagnetic materials such as soft iron. If the arrangement of the elements of the two sets is properly designed, magnetic attraction and repulsion forces between the elements of the two sets as the machine operates produce an anti-cogging torque that substantially cancels out the cogging torque of the machine.

One aspect of the invention provides an anti-cogging apparatus to be installed on a permanent magnet electrical machine having a rotor, a stator and a cogging torque, and for reducing the cogging torque. The anti-cogging apparatus comprises: a first component to be mechanically coupled to one of the rotor and the stator and having a first set of elements of magnetic material disposed along a first circle; and a second component to be mechanically coupled to the other one of the rotor and the stator and having a second set of at least one element of magnetic material disposed along a second circle to be coaxial with the first circle. The second set is to be facing the first set for passive magnetic interaction, with an air gap between the first and the second set. At least one of the first set and the second set has permanent magnets for generating an anti-cogging torque as a result of the passive magnetic interaction between the first set and the second set. The anti-cogging torque has a magnitude substantially matching the magnitude of the cogging torque and a direction opposite to the direction of the cogging torque, thereby substantially canceling out the cogging torque.

Another aspect of the invention provides a permanent magnet electrical machine with reduced cogging torque. The machine comprises: a rotor with permanent magnets; a stator concentrically mounted to the rotor, for relative rotation of the rotor to the stator thereby generating a cogging torque; a first component mechanically coupled to one of the rotor and the stator and having a first set of elements of magnetic material disposed along a first circle; and a second component mechanically coupled to the other one of the rotor and the stator and having a second set of at least one element of magnetic material disposed along a second circle coaxial with the first circle. The second set faces the first set for passive magnetic interaction, with an air gap between the first and the second set. At least one of the first set and the second set has permanent magnets for generating an anti-cogging torque as a result of the passive magnetic interaction between the first set and the second set. The anti-cogging torque has a magnitude substantially matching the magnitude of the cogging torque and a direction opposite to the direction of the cogging torque, thereby substantially canceling out the cogging torque.

Yet another aspect of the invention provides a method for reducing the cogging torque of a permanent magnet machine. The method comprises: providing a permanent magnet machine having a rotor and a stator; determining the cogging torque of the machine; providing a first component having a first set of elements of magnetic material disposed along a first circle, and a second component having a second set of at least one element of magnetic material disposed along a second circle, wherein at least one of the first set and the second set has permanent magnets for generating an anti-cogging torque as a result of passive magnetic interaction between the first set and the second set, the anti-cogging torque having an magnitude substantially matching the magnitude of the cogging torque and a direction opposite to the direction of the cogging torque, thereby substantially canceling out the cogging torque; and mechanically coupling one of the first and the second component to the rotor and mechanically coupling the other component to the stator such that the first circle is coaxial to the second circle and that the first set faces the second set with an air gap for magnetic interaction.

BRIEF DESCRIPTION OF THE DRAWINGS

Further features and advantages of the present invention will become apparent from the following detailed description, taken in combination with the appended drawings, in which:

FIG. 3 comprises FIG. 3A and FIG. 3B, wherein

FIG. 5 comprises FIG. 5A and FIG. 5B, wherein

FIG. 6 comprises FIG. 6A and FIG. 6B, wherein

FIG. 7 comprises FIG. 7A and FIG. 7B, wherein

It will be noted that throughout the appended drawings, like features are identified by like reference numerals.

DETAILED DESCRIPTION

Figure 1:
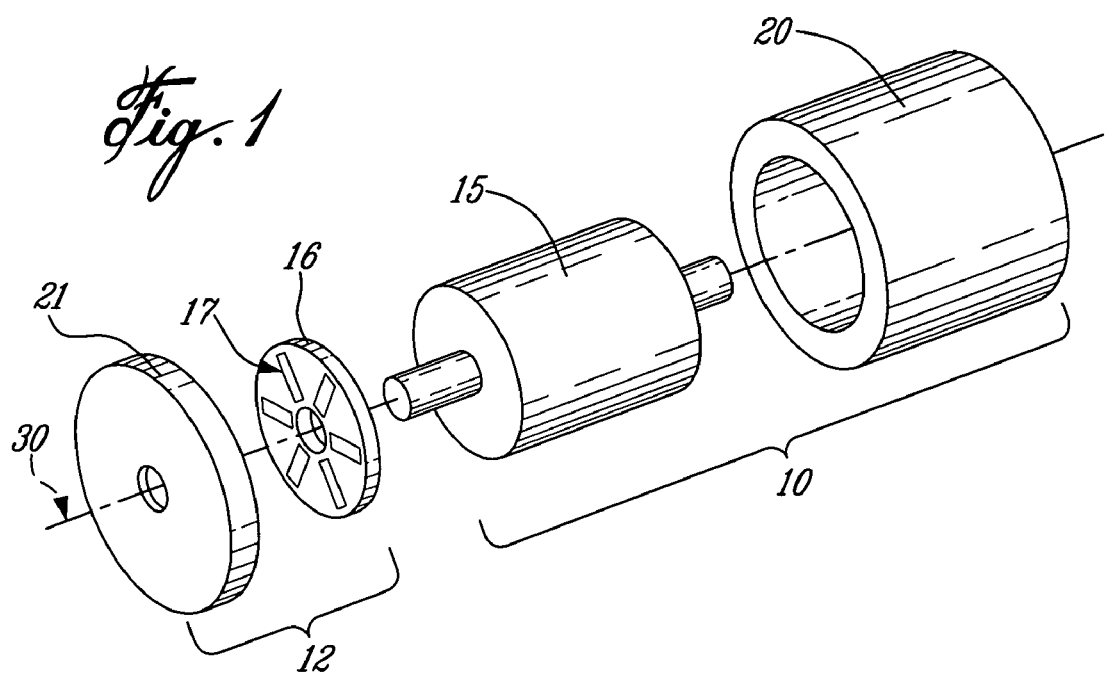
FIG. 1 is an exploded perspective view of a rotary PM machine including an anti-cogging apparatus, according to an embodiment of the invention wherein the anti-cogging apparatus comprises two disks.
Figure 2:
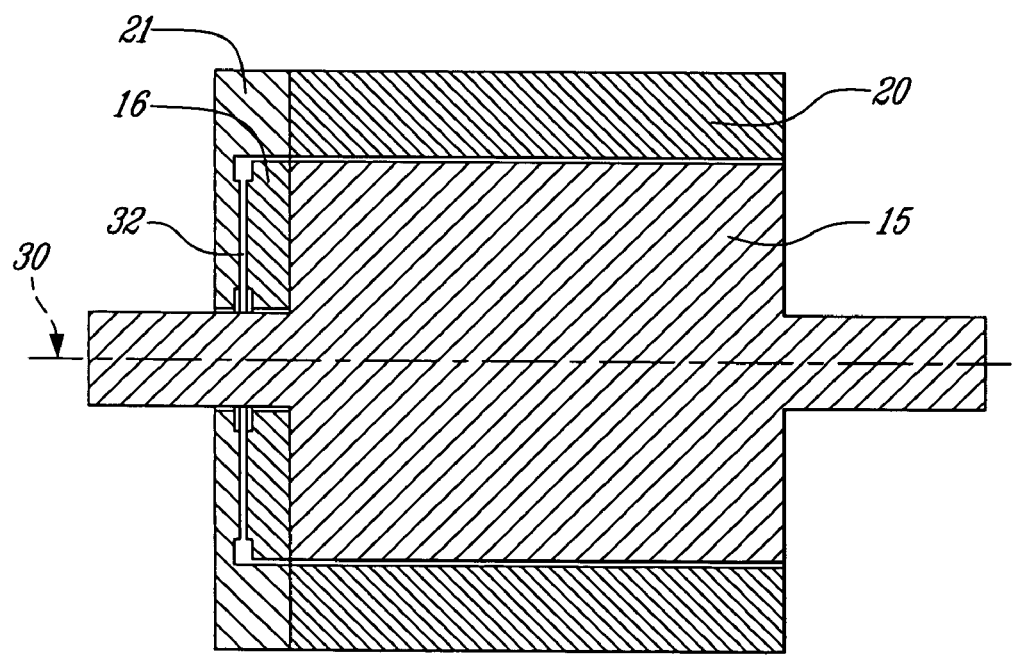
FIG. 2 is a longitudinal cross sectional view of the rotary PM machine of FIG. 1.
Figure 3A:
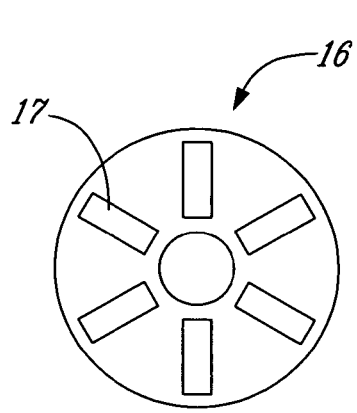
FIG. 3A is a front view of the disk that is coupled to the rotor in the anti-cogging apparatus illustrated in FIG. 1
Figure 3B:
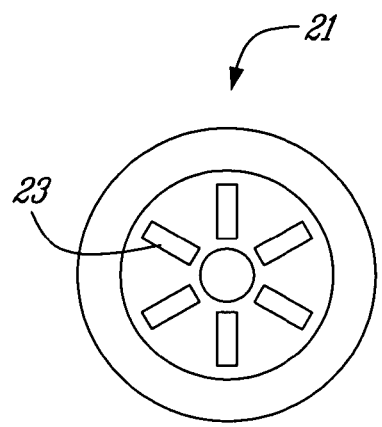
FIG. 3B is a back view of the disk that is coupled to the stator in the anti-cogging apparatus illustrated in FIG. 1.

Now referring to the drawings, FIG. 1 and FIG. 2 illustrate a rotary PM machine 10 along with an anti-cogging apparatus 12, according to an embodiment of the invention. The PM machine 10 comprises a rotor 15 and a stator 20. In this embodiment, the stator 20 is external to the rotor 15 but in other embodiments, the stator 20 could be internal to the rotor 15. An anti-cogging apparatus 12 is installed on the PM machine 10 for reducing its cogging torque. The anti-cogging apparatus 12 comprises a first disk 16 having a first set of magnetic elements 17 (see FIG. 3A) and a second disk 21 having a second set of magnetic elements 23 (see FIG. 3B). The magnetic elements of each set 17, 23 are circularly arranged about the axis of their respective disk 16, 21 with a space between each two successive elements of the set. FIG. 3A shows the first set of magnetic elements 17 on the first disk 16 and FIG. 3B shows the second set of magnetic elements 23 on the second disk 21. The two disks 16, 21 are placed side-by-side such that the two sets of magnetic elements 17, 23 face one another with an air gap 32 (shown in FIG. 2). In this embodiment, the axes of the two disks 16, 21 are aligned on the axis of rotation of the PM machine 10, but the two disks 16, 21 could alternatively be misaligned from the PM machine 10 (using geared transmission for example) as long as one disk 16 is mechanically coupled to the rotor 15 and the other disk 21 is mechanically coupled to the stator 20 such that the rotation of the first disk 16 relative to the second disk 17 follows the rotation of the rotor 15 relative to the stator 20. The two disks 16, 17 are respectively affixed to the rotor 15 and the stator 20 using bolts and nuts, rivets, adhesive, or any other coupling means (not shown in the figures).

In the embodiment of FIG. 1, the first set 17 is composed of six permanent magnets and the second set 23 of six soft iron elements. In this embodiment, the permanent magnets all have the same polarity facing the second set 23, i.e. the north pole of each permanent magnet faces the second set 23 (non-alternating permanent magnets). This embodiment is adapted to cancel out a cogging torque having an angular period of 60° as a function of the mechanical angle between the rotor 15 and the stator 20.

As the rotor 15 rotates, the first disk 16, which is mechanically coupled to the rotor 15, follows and rotates relative to the second disk 21 which is mechanically coupled to the fixed stator 20. The soft iron elements 23 react in the magnetic field of the permanent magnets elements 17 and are attracted by the permanent magnet elements 17. Since the set of permanent magnet elements 17 and the set of soft iron elements 23 are periodically arranged respectively along the first disk 16 and the second disk 21, the magnetic attraction force produces a torque that varies as a function of the angle between the rotor 15 and the stator 20. When the two sets of magnetic elements 17, 23 are phase shifted, the attraction force between the two sets 17, 23 produces a torque that tends to realign the two sets 17,23. When the two sets are aligned, the torque is null. An angularly variable torque is thus provided and when the phase shift between the anti-cogging apparatus and the PM machine 10 is properly adjusted, the anti-cogging torque at least partly cancels out the cogging torque of the machine 10. The number of elements in each set of magnetic elements 17, 23, their shape, their orientation and their position are adjusted such that the magnetic interaction between the first set of magnetic elements 17 on the first disk 16 and the second set of magnetic elements 23 on the second disk 21 produces an anti-cogging torque having a magnitude as close as possible to the magnitude of the cogging torque of the PM machine 10 but with a direction opposite to the direction of the cogging torque, thereby substantially canceling out the cogging torque of the PM machine 10.

It is noted that the first disk 16 and the second disk 21 could be interchanged such that the first disk 16 be coupled to the stator 20 and the second disk 21 be coupled to the rotor 15. This substitution would have no effect on the magnitude of the provided anti-cogging torque. One skilled in the art will appreciate that the weight of each set of magnetic elements 17, 23 should be considered in selecting which disk is to be coupled to the rotor 15.

Any PM machine 10 having a cogging torque, including motors and generators, can benefit from the present invention. For example, the PM machine 10 can be an alternating current motor, a brushless direct current motor, a three-phase electrical generator, a transverse flux electrical generator, PM machines with phase shifted poles or skewed poles for reducing cogging torque, etc.

If the cogging torque to be cancelled out has a large amplitude, the soft iron elements of the second set could be replaced by permanent magnets. In one embodiment, the south poles of all the permanent magnets of the second set face the north poles of the permanent magnets of the first set. During operation of the PM machine 10, the elements of the first and the second sets are attracted and the angularly variable attractive force provides an anti-cogging torque.

In another embodiment, the north poles of all the permanent magnets of the second set face the north poles of the permanent magnets of the first set. In this case, the angularly variable repulsion force of the magnets provides the anti-cogging torque. It should be appreciated that a set of south-pole permanent magnets could be inserted between the north-pole permanent magnets of the first set so that polarities would alternate along the disk. The number of permanent magnets would then be doubled and the amplitude of the anti-cogging torque would be increased.

Similarly, if the cogging torque to be cancelled out has a rather small amplitude, whether the elements of the second set be soft iron elements or permanent magnets, the number of elements of the second set can be reduced. For example, in one embodiment, the second set is only composed of one permanent magnet aligned with and facing one of the permanent magnets of the first set. The angular period of the anti-cogging torque (as a function of the angle between the rotor and the stator) is then the same as if the number of elements of the second set would be equal to the number of elements of the first set but the amplitude of the produced anti-cogging torque is lower. The number of elements of the second set can be any divisor of the number of elements of the first set without modifying the angular period of the cogging torque.

Figure 4:
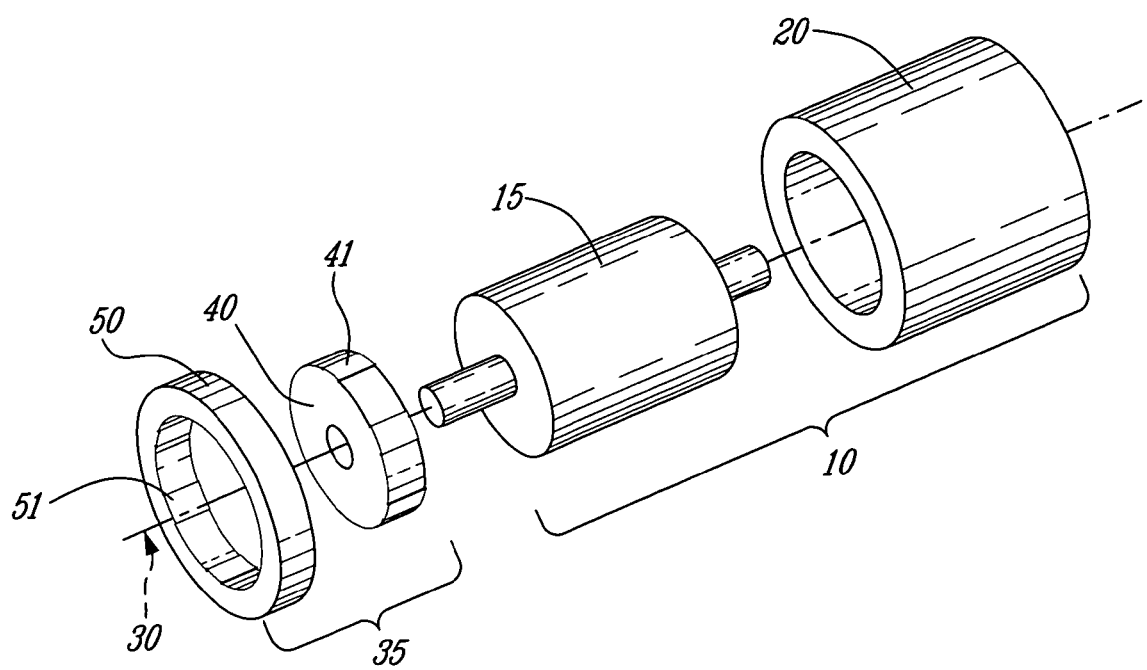
FIG. 4 is an exploded perspective view of a rotary PM machine including an anti-cogging apparatus, according to another embodiment of the invention wherein the anti-cogging apparatus comprises two rings, one fitted within the other, each having a set of magnetic elements, the two sets facing one another.

FIG. 4 illustrates a rotary PM machine 10 along with an alternative configuration of the anti-cogging apparatus 35 which uses two concentric rings 40, 50 fitted one over the other and each bearing a set of magnetic elements 41, 51. The first ring 41 is mechanically coupled to the rotor 15 of the PM machine 10 and the second ring 50 is mechanically coupled to the stator 20. The two sets of magnetic elements 41, 51 face one another for magnetic interaction, with an air gap therebetween.

Figure 5A:
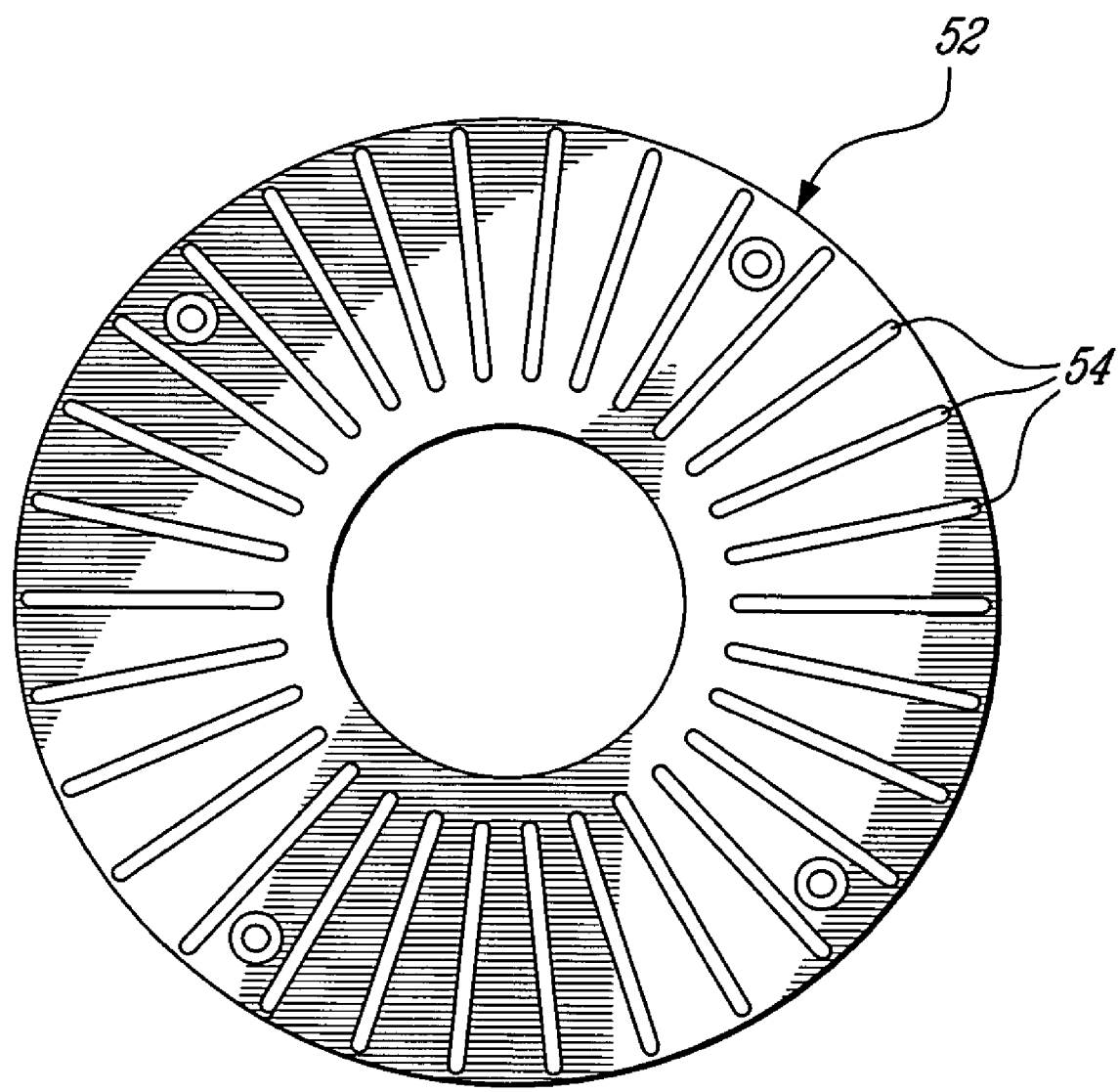
FIG. 5A is a front view of the disk that is coupled to the rotor and FIG. 5B is a back view of the disk that is coupled to the stator in an anti-cogging apparatus, wherein each disk has thirty permanent magnets distributed thereon.
Figure 5B:
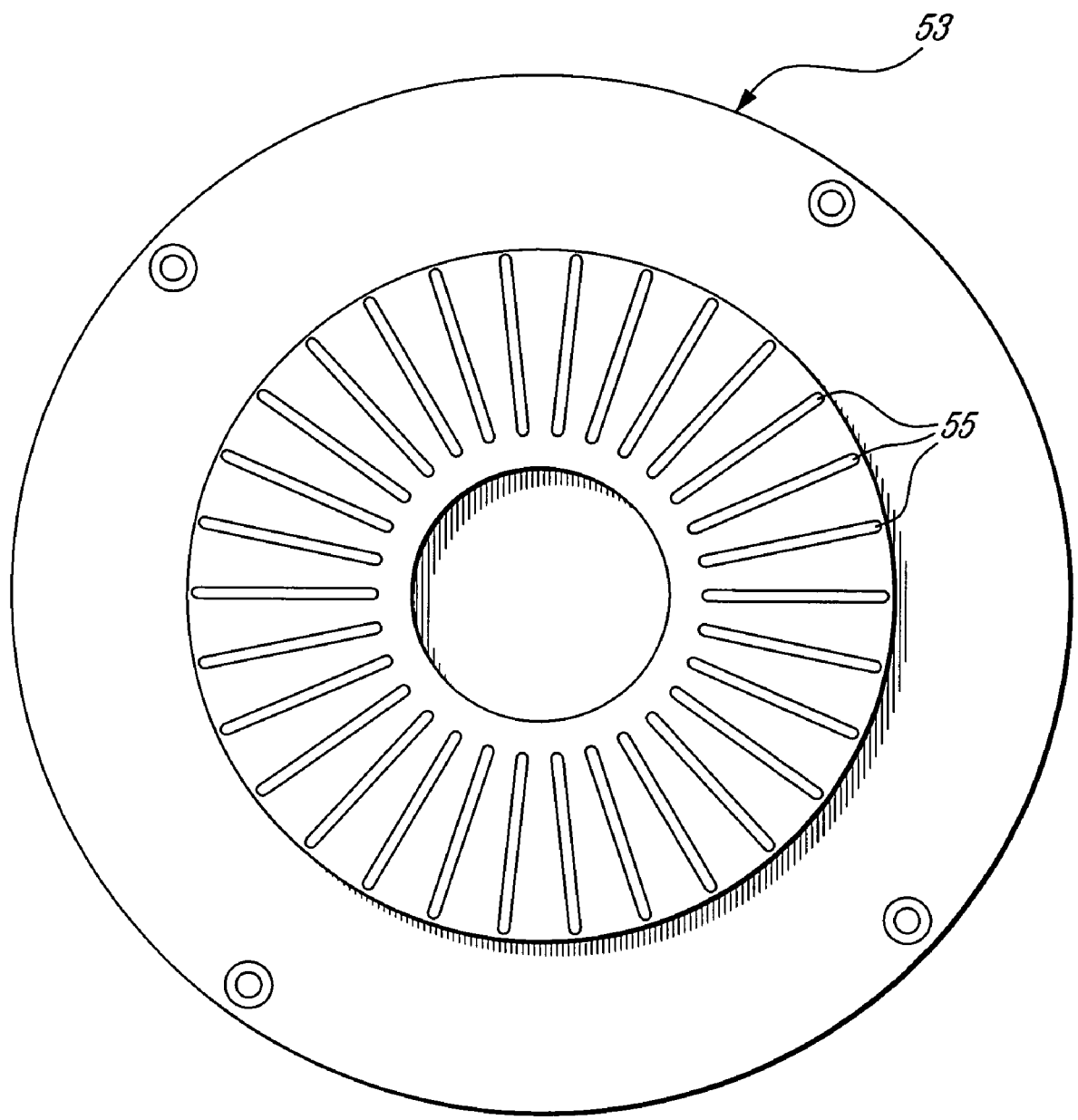

FIG. 5A and FIG. 5B respectively illustrate a first disk 52 and a second disk 53 of an anti-cogging apparatus adapted to substantially cancel out the cogging torque of a transverse flux electrical generator having fifteen stator cores and fifteen pairs of rotor permanent magnets. The first disk 52 is to be coupled to the rotor and the second disk 53 is to be coupled to the stator of the generator. The cogging torque of the generator has a main period component of 12°. The first disk 52 and the second disk 53 respectively comprise a first set 54 and a second set 55 of thirty circularly distributed permanent magnets. In each set 54, 55, the permanent magnets are separated and have no direct contact with one another, i.e. they are angularly spaced by non magnetic material or air. The two disks 52, 53 are to be mounted such that the first set 54 faces the second set 55 with an in-between air gap. Both the first set 52 and the second set 53 comprise non-alternating polarity permanent magnets, i.e. all having the same polarity (the north pole) facing the air gap.

Generally, a suitable anti-cogging apparatus can be designed for any PM machine. In order to design a suitable configuration of magnetic elements, first, the cogging torque to be compensated is determined. The main period component of the cogging torque can be easily determined since it is related to the number of teeth (m) on the stator, or the number of stator cores (m) in the case of a transverse flux machine, and to the number of pairs of magnets of circularly alternating polarities (n) on the rotor. The main period component can be generally calculated by dividing $\pi$ by the least common multiple (LCM) of the number of stator teeth/cores (m) and the number of pairs of magnets of circularly alternating polarities on the rotor (n) ($\pi/LCM(m,n)$). The exact variation of the cogging torque as a function of the relative angular position of the rotor to the stator can be measured using an appropriate method known by one skilled in the art. It can also be numerically calculated using, for instance, finite element analysis or an analytical solution.

The number of elements of the first set and of the second set of magnetic elements must be selected. The main angular period component of the anti-cogging torque should be the same as the main angular period component of the cogging torque to be cancelled out. Generally, if the like magnetic elements in the first set and the like magnetic elements in the second set are uniformly spaced, the main angular period component of the anti-cogging torque is calculated by dividing $2\pi$ by the least common multiple of the number of like magnetic elements in the first set (p) and the number of like magnetic elements in the second set (q) ($2\pi/LCM(p,q)$). For the purpose of this equation, soft iron elements are to be considered as like elements and permanent magnets having the same polarity facing the air gap are to be considered as like elements. If the permanent magnets of one group alternate in polarity, p (or q) is the number of pairs of magnets.

Figure 6A:
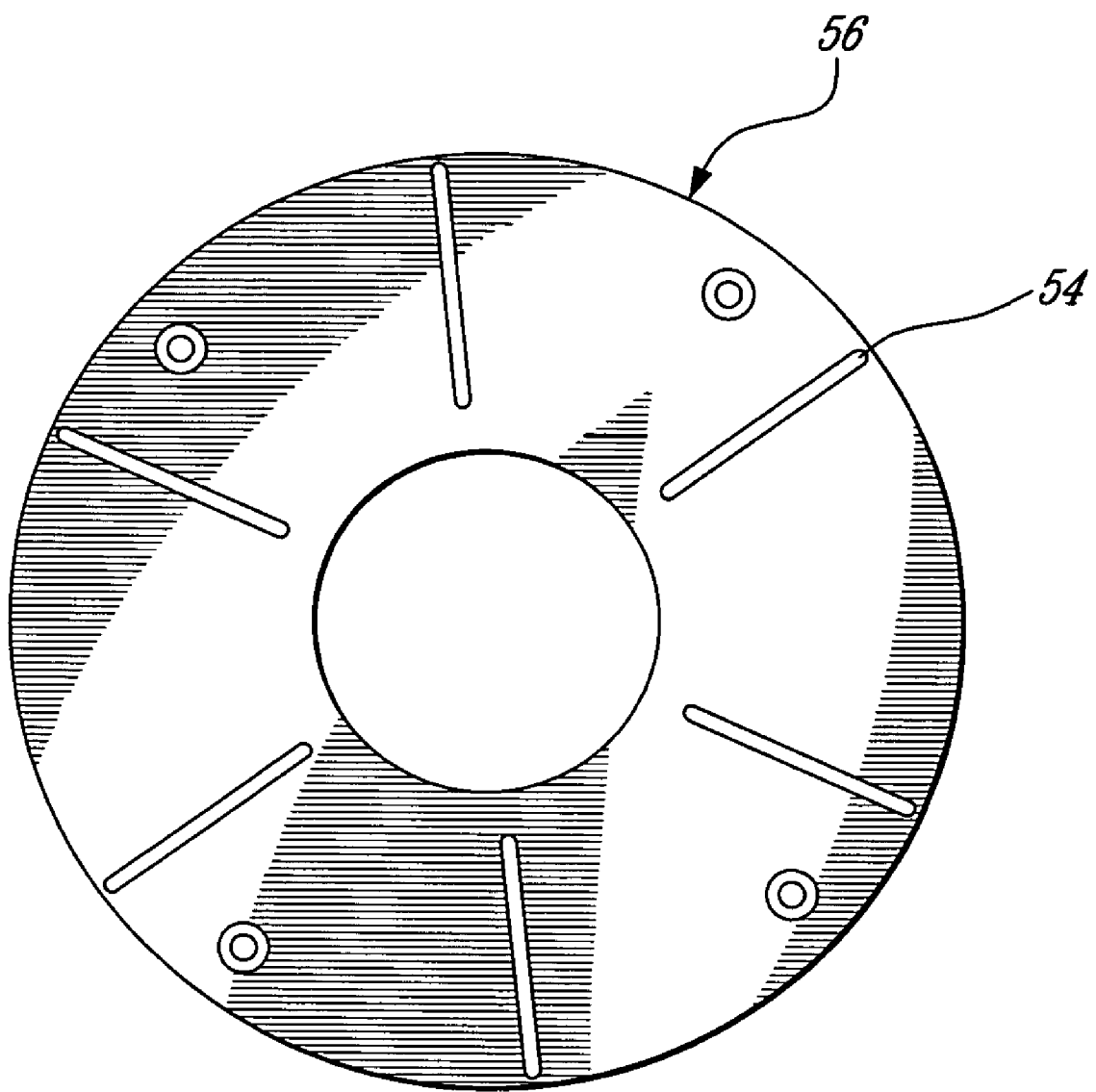
FIG. 6A is a front view of a first disk that is coupled to the rotor and FIG. 6B is a back view of a second disk that is coupled to the stator in an anti-cogging apparatus, wherein the front disk has six uniformly distributed permanent magnets and the second disk has five uniformly distributed permanent magnets.
Figure 6B:
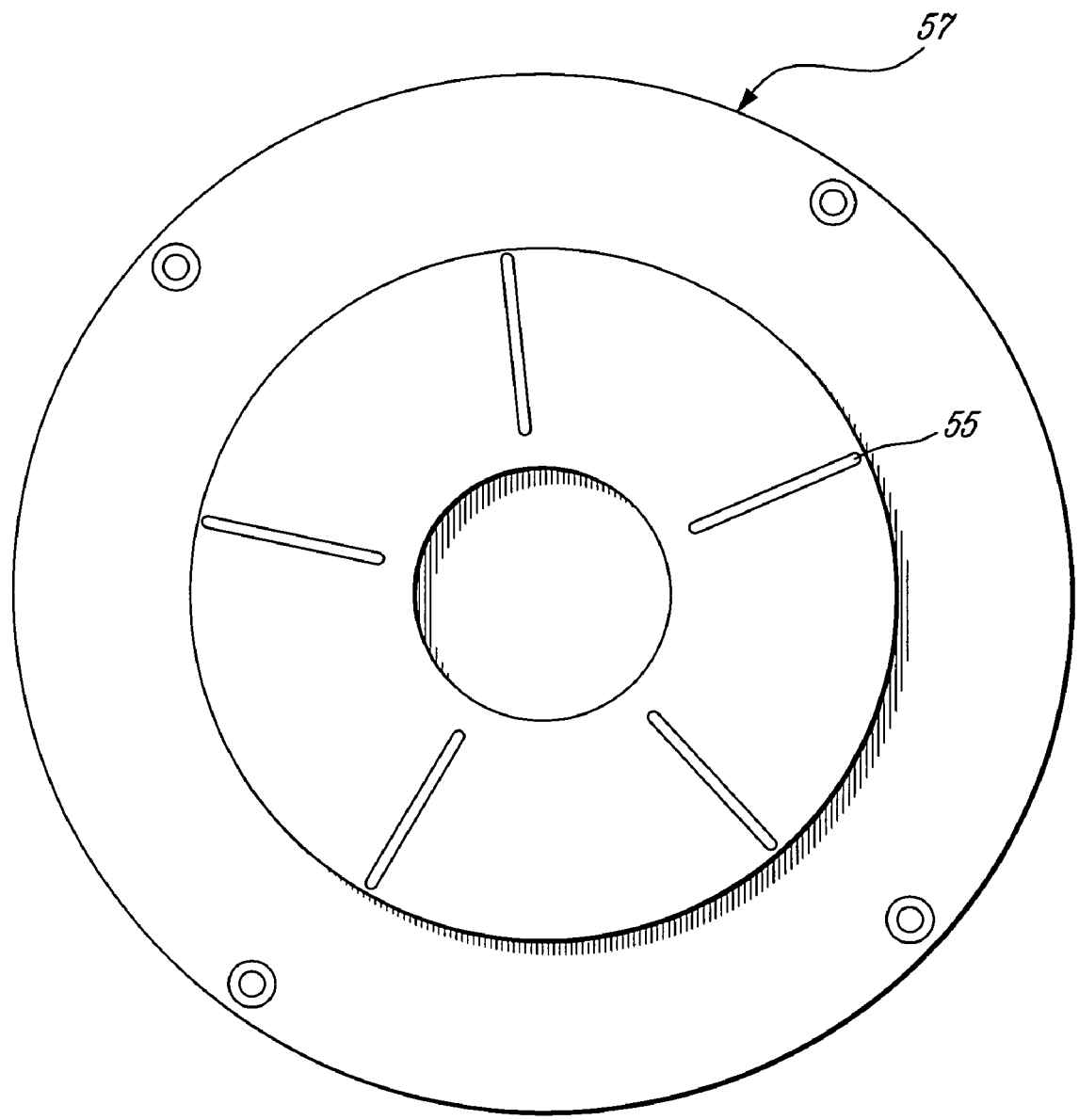

For example, for a PM machine having fifteen teeth and fifteen pairs of permanent magnets, the main angular period component of the cogging torque is 12° ($\pi/15$). FIGS. 6A and 6B illustrates one suitable design of an anti-cogging apparatus for reducing the cogging torque of such a PM machine. The anti-cogging apparatus has a first set 56 of six uniformly spaced non-alternating permanent magnets 54 and a second set 57 of five uniformly spaced non-alternating permanent magnets 55. Another suitable design of an anti-cogging apparatus has a first set of thirty non-alternating polarity and uniformly spaced permanent magnets and a second set of two uniformly spaced soft iron elements. Yet another suitable design has a first set of thirty uniformly spaced non-alternating permanent magnets and a second set of thirty uniformly spaced non-alternating permanent magnets. Still another suitable design has a first set of sixty uniformly spaced alternating polarity permanent magnets and a second set of sixty uniformly spaced alternating permanent magnets.

In alternative embodiments, the number of magnetic elements in the first set is selected such that the angular period ($2\pi/p$) of the arrangement of the first set matches the main angular period component of the cogging torque. The second set may have a number q equal to p of uniformly spaced like magnetic elements, or one or more elements of the second set may be omitted while the other elements remain at their original position. Accordingly, the number of like magnetic elements of the second set is any positive integer no greater than p and the like magnetic elements are located on selected ones of p uniformly spaced positions. In other words, the spacing between two consecutive magnetic elements in the second set is a multiple of the first angular period ($2\pi/p$). For instance, according to the above described example where a PM machine has fifteen teeth and fifteen pairs of permanent magnets, the angular period ($2\pi/p$) of the arrangement of the first set is 12° and the number of uniformly spaced like magnetic elements in the first set is thirty. The second set may have a number q of thirty uniformly spaced like magnetic elements or one to twenty-nine elements may be omitted while the other elements remains at their original position.

The amplitude of the anti-cogging torque can be matched to the amplitude of the cogging torque by varying the number of magnetic elements in the first and the second set. For example, for a main angular period component of the cogging torque to be cancelled out of 12° ($\pi/15$), one suitable first set is composed of thirty non-alternating polarity permanent magnets. The second set can then be composed of only one permanent magnet but the amplitude of the produced torque may then be too weak to cancel out the cogging torque of the PM machine. As described above, the number of permanent magnets in the second set can be increased to up to thirty, depending on the amplitude of the cogging torque to be cancelled out. Additionally, the radial position of the two sets can be varied to match the amplitude of the anti-cogging torque to the cogging torque to be cancelled out.

It should be noted that the variation of the magnitude of the cogging torque as a function of the angular position can be more complex. For a better cogging torque cancellation, the magnitude of the anti-cogging torque as a function of the angular position should be matched to the magnitude of the cogging torque (same magnitude but opposite direction). In order to adjust the angular variation of the magnitude of the anti-cogging torque, the shape of the magnetic elements can be tweaked. Trial and error, analytical and finite element resolution methods can be used for this purpose.

Figure 7A:
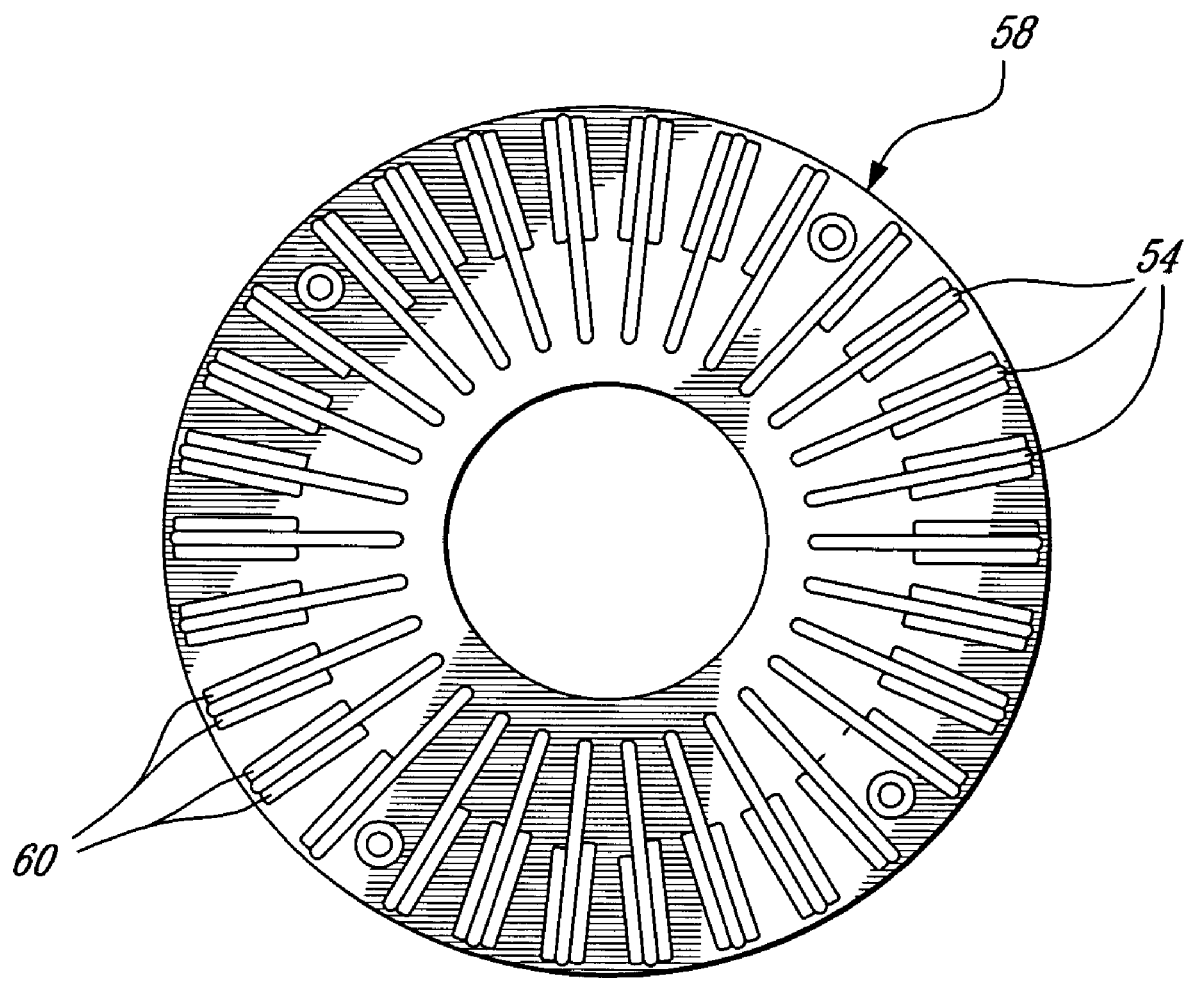
FIG. 7A is a front view of the disk that is coupled to the rotor and FIG. 7B is a back view of the disk that is coupled to the stator in an anti-cogging apparatus, wherein each disk has thirty permanent magnets distributed thereon and PM shape modifiers located on each side of each permanent magnets.
Figure 7B:
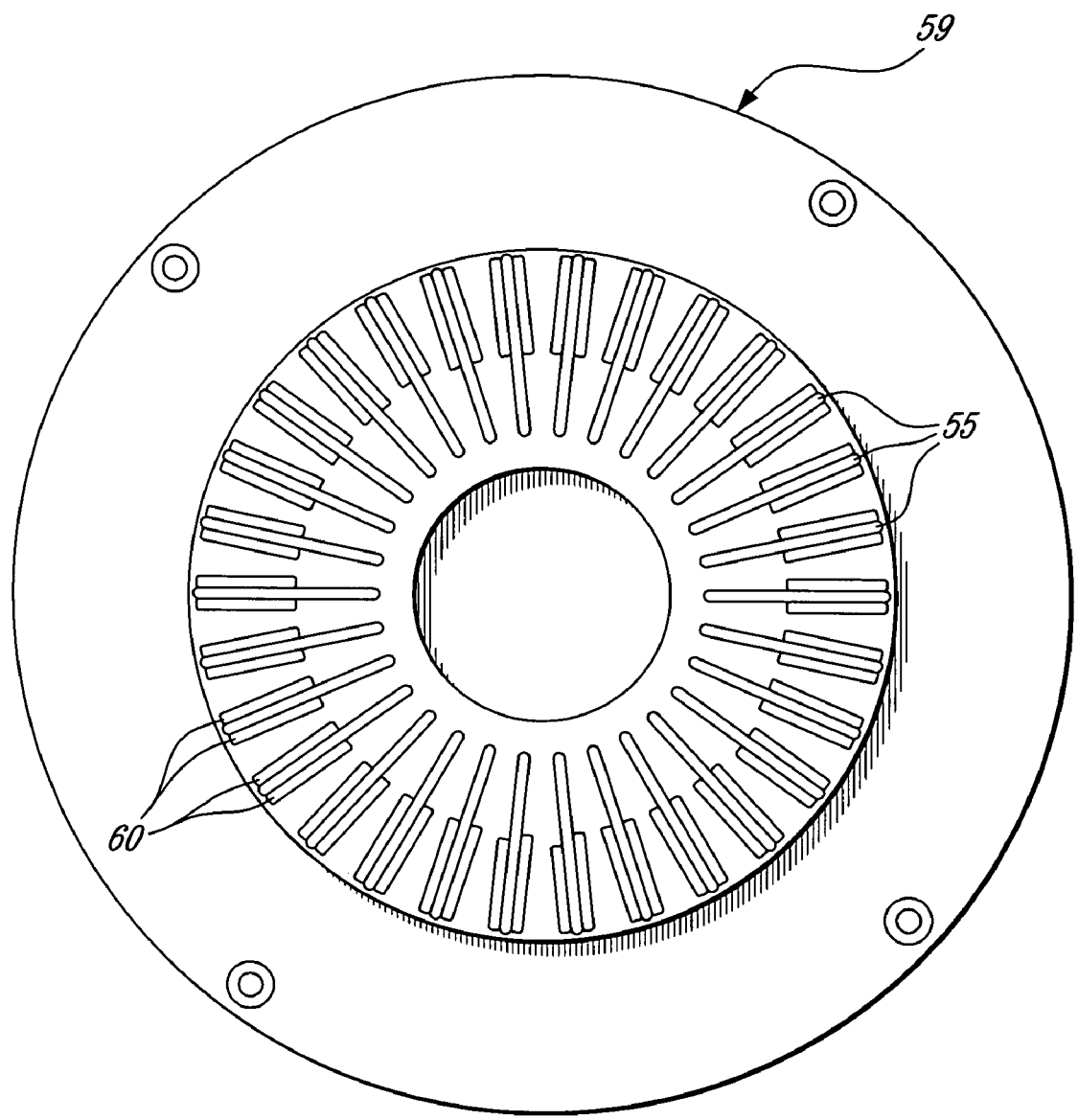

One embodiment wherein the magnitude of the anti-cogging torque is adjusted by modifying the shape of the magnetic elements is shown in FIG. 7A and FIG. 7B. This embodiment is equivalent to the embodiment illustrated in FIGS. 5A and 5B but the shape of the permanent magnets of both the first set 54 and the second set 55 is tweaked by providing PM shape modifiers 60. FIG. 7A shows the first disk 58 that is coupled to the rotor and FIG. 7B shows the second disk 59 that is coupled to the stator of the PM machine. As in the embodiment of FIG. 5A and FIG. 5B, this embodiment is adapted for a transverse flux electrical generator having fifteen stator cores and fifteen pairs of rotor permanent magnets. The PM shape modifiers 60 are pieces of non-magnetized magnetic material such as soft iron pieces. One PM shape modifier 60 is placed on each side of each permanent magnet. In the illustrated embodiment, each permanent magnet is rectangular and has its longest length along the radius of the anti-cogging apparatus. Each PM shape modifier 60 is also rectangular and its longest length is about half of the longest length of the permanent magnets. The PM shape modifiers 60 are juxtaposed to the radially external half of the permanent magnets and on each of their sides. The addition of the PM shape modifiers 60 results in an angular widening of the permanent magnets on their radially external half. The resultant modified permanent magnet has a "T"-shape and the resultant modified permanent magnets still have no direct contact with one another.

Figure 8:
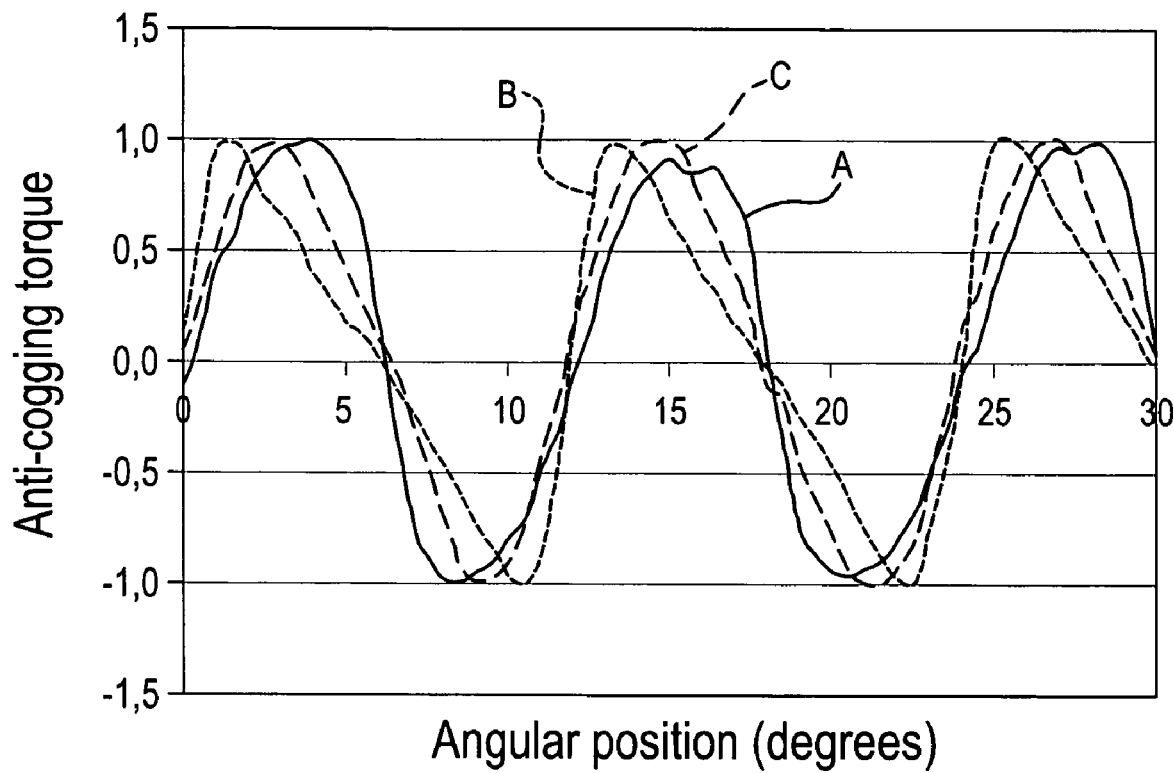
FIG. 8 is a graph showing the effects of the PM shape modifiers of FIG. 6A and FIG. 6B on the torque produced by the anti-cogging apparatus, wherein curve A shows the shape of the cogging torque to be cancelled out, curve B shows the shape of the anti-cogging torque produced by an anti-cogging apparatus having no PM shape modifier and curve C shows the shape of the anti-cogging torque produced by an anti-cogging apparatus having PM shape modifiers and wherein curves A, B and C are normalized in amplitude and curves B and C are sign-inverted for better visual comparison with the cogging torque.

FIG. 8 is a graph showing the effect of the PM shape modifiers shown in FIG. 7A and FIG. 7B on the torque produced by the anti-cogging apparatus, by comparing it to the torque produced by the anti-cogging apparatus illustrated in FIG. 5A and FIG. 5B and having no PM shape modifier. Curve A shows the shape of the cogging torque to be cancelled out as a function of the angular position of the generator (the torque as shown is normalized in amplitude). Curve B shows the shape of the anti-cogging torque produced by the anti-cogging apparatus illustrated in FIG. 5A and FIG. 5B and having no PM shape modifiers, as a function of the angular position (the torque is normalized in amplitude and sign-inverted for better visual comparison with the cogging torque). One should appreciate that the match between curve A and curve B is not perfect and that the anti-cogging torque shown in curve B does not fully, but still substantially does, cancel out the cogging torque of the generator. Curve C shows the shape of the anti-cogging torque produced by the anti-cogging apparatus illustrated in FIG. 7A and FIG. 7B and having PM shape modifiers, as a function of the angular position (as for curve B, the torque is normalized in amplitude and sign-inverted). Compared to the anti-cogging torque of curve B, the anti-cogging torque of curve C better matches the shape of cogging torque of the generator as a function of the angular position of the generator.

It should be appreciated that the configuration of the PM shape modifiers 60 illustrated in FIG. 7A and FIG. 7B and described herein is given as an example and that any shape of magnetic element could be designed or chosen by trial and error so that the anti-cogging torque cancels out with the best possible match the cogging torque of a given PM machine. For example, a resultant shape of a magnetic element could be a cross, a "V" or any other shape.

It is noted that, since the magnetic elements are passive ones, such as permanent magnets and other ferromagnetic materials, the interaction between the two sets of magnetic elements is passive as opposed to, for instance, the active interaction between electromagnets and permanent magnets, which uses an external energy source and control to provide electrical current to the coils of the electromagnets to magnetize its ferromagnetic core.

Multiple pairs of sets of magnetic elements could be used in the anti-cogging apparatus in order to fine tune the magnitude of the anti-cogging torque to match the one of the cogging torque. For example, one pair of sets of magnetic elements could be used for canceling out the cogging torque associated with each phase of a three-phase machine.

Magnetic elements could be uniformly or non-uniformly disposed in a circular array, magnetic elements could be phase shifted or magnetic elements of the same set could be radially misaligned in order to modify the magnitude of the anti-cogging torque as a function of the angular position in order better match the magnitude of the cogging torque of the PM machine.

It is also noted that while in the illustrated embodiments one of the two poles of each permanent magnet faces the air gap between the first and the second set of magnetic elements, each permanent magnet could alternatively be disposed such that its both poles are to be adjacent to the air gap, each permanent magnet thereby providing two magnetic poles alternating along the disk or the tube.

The embodiments of the invention described above are intended to be exemplary only. The scope of the invention is therefore intended to be limited solely by the scope of the appended claims.

What is claimed is:

1. An anti-cogging apparatus for installation on a permanent magnet electrical machine having a rotor, a stator and a cogging torque, the anti-cogging apparatus for reducing said cogging torque, said anti-cogging apparatus comprising:
    a first component mechanically coupled to one of said rotor and said stator and having a first set of elements of magnetic material disposed along a first circle; and
    a second component mechanically coupled to the other one of said rotor and said stator and having a second set of a plurality of elements of magnetic material disposed along a second circle coaxial with said first circle, the elements of said first set being uniformly arranged on the first circle with a first angular period and the elements of said second set being uniformly arranged on the second circle with a second angular period, and with the first and second sets facing each other, with an air gap there between, for passive magnetic interaction; and
    wherein:
        at least one of said first and second sets has permanent magnets for generating an anti-cogging torque as a result of the passive magnetic interaction between said first and second sets, said anti-cogging torque having a magnitude substantially matching a magnitude of said cogging torque and a direction opposite to the direction of said cogging torque, thereby substantially canceling out said cogging torque, and
        said cogging torque has a main angular period component as a function of a mechanical angle between the rotor and the stator, and said main angular period component is equal to a greatest common divisor of said first angular period and said second angular period.

2. The anti-cogging apparatus as claimed in claim 1, wherein said first angular period is equal to said main angular period component and said second angular period is a multiple of said first angular period but not less than said first angular period.

3. The anti-cogging apparatus as claimed in claim 1, wherein
said stator has m teeth and said rotor has n pairs of permanent magnets,
said first set has a number p of like elements of magnetic material, p being equal to twice a least common multiple of m and n, and
said second set has a number q of like elements of magnetic material, q being a positive integer no greater than p.

4. The anti-cogging apparatus as claimed in claim 3, wherein like elements of magnetic elements in said first set are uniformly disposed with a first spacing, and a spacing between consecutive ones of said like elements of magnetic material in said second set is a multiple of said first spacing.

5. The anti-cogging apparatus as claimed in claim 3, wherein elements of said first set and elements of said second set are uniformly disposed and wherein p is a multiple of q.

6. The anti-cogging apparatus as claimed in claim 3, wherein each of said like elements of magnetic material comprises a permanent magnet, all permanent magnets having a same polarity facing said air gap.

7. The anti-clogging apparatus as claimed in claim 3, wherein each of said like elements of magnetic material comprises a pair of opposite polarity permanent magnets, with polarities of the permanent magnets of said first set alternating on said first component.

8. The anti-cogging apparatus as claimed in claim 3, wherein p is equal to twice the least common multiple of m and n and q is a divisor of p.

9. The anti-cogging apparatus as claimed in claim 1, wherein said first set has permanent magnets and said second set has at least one soft iron element.

10. The anti-cogging apparatus as claimed in claim 1, wherein said first set has permanent magnets and said second set has at least one permanent magnet.

11. The anti-cogging apparatus as claimed in claim 10, wherein said first set and said second set each are of non-alternating polarities.

12. The anti-cogging apparatus as claimed in claim 1, wherein said first set has permanent magnets and wherein said first component further comprises a permanent magnet shape modifier made of magnetic material for each permanent magnet of said first set.

13. The anti-cogging apparatus as claimed in claim 1, wherein each of said first and second components has a disk shape.

14. The anti-cogging apparatus as claimed in claim 1, wherein each of said first and second components is in the shape of a ring.

15. A permanent magnet electrical machine with reduced cogging torque, said machine comprising:
a rotor with permanent magnets;
a stator, concentrically mounted to said rotor, for relative rotation of said rotor with respect to the stator thereby generating a cogging torque;
a first component mechanically coupled to one of said rotor and said stator and having a first set of elements of magnetic material disposed along a first circle; and
a second component mechanically coupled to the other one of said rotor and said stator and having a second set of a plurality of elements of magnetic material disposed along a second circle coaxial with said first circle, the elements of said first set being uniformly arranged on the first circle with a first angular period and the elements of said second set being uniformly arranged on the second circle with a second angular period, and with the first and second sets facing each other for passive magnetic interaction and with an air gap there between; and
wherein:
at least one of said first and second sets has permanent magnets for generating an anti-cogging torque as a result of the passive magnetic interaction between said first and second sets, said anti-cogging torque having a magnitude substantially matching a magnitude of said cogging torque and a direction opposite to the direction of said cogging torque, thereby substantially canceling out said cogging torque, and
said cogging torque has a main angular period component as a function of a mechanical angle between the rotor and the stator, and said main angular period component is equal to a greatest common divisor of said first angular period and said second angular period.

16. The permanent magnet electrical machine as claimed in claim 15, wherein said first angular period is equal to said main angular period component and said second angular period is a multiple of said first angular period but not less than said first angular period.

17. The permanent magnet electrical machine as claimed in claim 15, wherein
said stator has m teeth and said rotor has n pairs of permanent magnets,
said first set has a number p of like elements of magnetic material, p being equal to twice the least common multiple of m and n, and
said second set has a number q of like elements of magnetic material, p being a positive integer no greater than p.

18. The permanent magnet electrical machine as claimed in claim 17, wherein like elements of magnetic elements in said first set are uniformly disposed with a first spacing, and a spacing between consecutive ones of said like elements of magnetic elements in said second set is a multiple of said first spacing.

19. The anti-cogging apparatus as claimed in claim 17, wherein elements of said first and second sets are uniformly disposed and p is a multiple of q.

20. The permanent magnet electrical machine as claimed in claim 17, wherein each of said like elements of magnetic material comprises a permanent magnet, all permanent magnets having a same polarity facing said air gap.

21. The permanent magnet electrical machine as claimed in claim 17, wherein each of said like elements of magnetic material comprises a pair of opposite polarity permanent magnets, with polarities of the permanent magnets of said first set alternating on said first component.

22. The permanent magnet electrical machine as claimed in claim 15, wherein
said permanent magnet electrical machine comprises a transverse flux electrical machine, and
said stator has m cores and said rotor has n pairs of permanent magnets having circularly alternating polarities.

23. The permanent magnet electrical machine as claimed in claim 22, wherein
said first set has a number p of uniformly distributed like elements of magnetic material, and said second set has a number q of uniformly distributed like elements of magnetic material, a least common multiple of m and n being equal to a least common multiple of p and q.

24. The anti-cogging apparatus as claimed in claim 23, wherein p is equal to twice the least common multiple of m and n, and q is a divisor of p.

25. The permanent magnet electrical machine as claimed in claim 15, wherein said first set has permanent magnets and said second set has at least one soft iron element.

26. The permanent magnet electrical machine as claimed in claim 15, wherein said first set has permanent magnets and said second set has at least one permanent magnet.

27. The permanent magnet electrical machine as claimed in claim 15, wherein said first set has permanent magnets and said first component further comprises a permanent magnet shape modifier made of magnetic material for each permanent magnet of said first set.

28. The permanent magnet electrical machine as claimed in claim 15, wherein each of said first and second components has a disk shape.

29. The permanent magnet electrical machine as claimed in claim 15, wherein each of said first and second components is in the shape of a ring.

30. A method for reducing cogging torque of a permanent magnet machine, the method comprising the steps of:
   providing a permanent magnet machine having a rotor and a stator;
   determining the cogging torque of the machine;
   providing a first component having a first set of elements of magnetic material disposed along a first circle, and a second component having a second set of a plurality of elements of magnetic material disposed along a second circle, the elements of said first set being uniformly arranged on the first circle with a first angular period and the elements of said second set being uniformly arranged on the second circle with a second angular period, wherein
   at least one of said first and second sets has permanent magnets for generating an anti-cogging torque as a result of passive magnetic interaction occurring between said first and second sets, said anti-cogging torque having a magnitude substantially matching a magnitude of said cogging torque and a direction opposite to the direction of said cogging torque, thereby substantially canceling out said cogging torque, and said cogging torque has a main angular period component as a function of a mechanical angle between the rotor and the stator, and said main angular period component is equal to a greatest common divisor of said first angular period and said second angular period; and
   mechanically coupling one of the first and second components to the rotor and mechanically coupling the other one of the first and second components to the stator such that the first circle is coaxial with the second circle and the said first set faces the second set, with an air gap situated there between, for the magnetic interaction.

* * * * *